(12) United States Patent
Oshiro

(10) Patent No.: US 6,421,598 B1
(45) Date of Patent: Jul. 16, 2002

(54) ANTI-LOCK BRAKE CONTROL DEVICE

(75) Inventor: Hiroshi Oshiro, Chiba-ken (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/637,464

(22) Filed: Aug. 10, 2000

(51) Int. Cl.⁷ .......................... B60K 41/44; F16H 61/00
(52) U.S. Cl. .................. 701/71; 701/78; 701/80; 303/121; 303/125; 188/2 R
(58) Field of Search ............... 701/71, 78, 80, 701/81, 73, 79, 69; 303/121, 125, 139, 148, 149; 188/2 R (56) References Cited

U.S. PATENT DOCUMENTS

| | | | | |
|---|---|---|---|---|
| 3,762,775 A | * | 10/1973 | Ochiai | 303/166 |
| 3,811,739 A | * | 5/1974 | Nakamura et al. | 303/171 |
| 3,826,541 A | * | 7/1974 | Arai et al. | 303/115.4 |
| 4,671,579 A | * | 6/1987 | Sawano et al. | 303/150 |
| 4,842,343 A | * | 6/1989 | Akiyoshi et al. | 303/163 |
| 4,984,164 A | * | 1/1991 | Maehara et al. | 701/74 |
| 5,058,019 A | * | 10/1991 | Litkouhi | 701/74 |
| 5,105,359 A | * | 4/1992 | Okubo | 701/80 |
| 5,148,368 A | * | 9/1992 | Okubo | 701/80 |
| 5,325,300 A | * | 6/1994 | Tsuyama et al. | 701/90 |
| 5,353,225 A | * | 10/1994 | Tsuyama et al. | 701/83 |
| 5,369,585 A | * | 11/1994 | Okubo | 701/80 |
| 5,423,601 A | * | 6/1995 | Sigl | 303/182 |
| 5,620,240 A | * | 4/1997 | Tuck et al. | 303/156 |
| 5,653,515 A | * | 8/1997 | Takeda et al. | 303/138 |
| 5,816,670 A | * | 10/1998 | Yamada et al. | 303/194 |
| 6,023,649 A | * | 2/2000 | Matsuura et al. | 701/71 |
| 6,024,420 A | * | 2/2000 | Yonemura et al. | 303/113.2 |
| 6,079,799 A | * | 6/2000 | Sawada et al. | 303/146 |
| 6,089,681 A | * | 7/2000 | Watanabe | 303/158 |
| 6,189,643 B1 | * | 2/2001 | Takahashi et al. | 180/248 |
| 6,231,134 B1 | * | 5/2001 | Fukasawa et al. | 303/152 |
| 6,276,767 B1 | * | 8/2001 | Nishizawa | 188/181 C |
| 6,280,003 B1 | * | 8/2001 | Oshiro et al. | 303/140 |

OTHER PUBLICATIONS

Japanese Patent Application Publication No. 11–189149 (with English abstract).

* cited by examiner

Primary Examiner—William A. Cuchlinski, Jr.
Assistant Examiner—Olga Hernandez
(74) Attorney, Agent, or Firm—Alan W. Cannon; Bozicevic, Field & Francis LLP (57) ABSTRACT

An anti-lock brake control system is provided which applies appropriate antilocking control while at the same time reduce the amount of brake fluid consumption normally experienced in vehicles with anti-lock brake systems. To that end, this invention is designed to provide an anti-lock brake control system where the rear wheel is individually controlled upon activating the brake force distribution control and the rear wheel is controlled on a select-low bases if the brake force distribution control is not activated. Various other methods of control are described.

16 Claims, 6 Drawing Sheets

ANTI-LOCK BRAKE CONTROL DEVICE

TECHNICAL FIELD

This invention relates to an anti-lock brake control device for a motor vehicle.

BACKGROUND OF THE INVENTION

Traditionally, when a braking system is switched in an anti-lock brake control mode, an anti-lock brake controller conducts a select-low control subroutine with regard to a rear wheel in order to secure stability of the vehicle by reducing or eliminating wheel lock. During a select-low control subroutine, the hydraulic pressure in the rear wheel is reduced or held, even if the rear wheel does not indicate a locking situation or a signal that the wheel is beginning to lock. A significant amount of brake fluid is "consumed" or passed through the system during an anti-lock braking procedure, as the pressure in the system is increased by opening an inlet valve to supply fluid to the system while an outlet valve is closed to increase the pressure; both inlet and outlet valves are closed to maintain pressure; and the outlet valve is opened with the inlet valve closed, to decrease pressure. Because of this, an anti-lock braking system requires a larger storage capacity of braking fluid than in a standard system, as well as a larger motor and/or pump to cycle the fluid. Further, because the select-low routine reduces or holds the pressure in the rear wheels even when the rear wheel does not show a tendency to be locked, this reduces the amount of braking force which could otherwise be achieved if the pressure were not held constant or reduced on the rear wheels in such situations.

Still further, even if the anti-lock brake control device conducts a braking force distribution control routine, after the rear wheel control is switched to an anti-lock brake control mode, the brake fluid consumption increases by frequently repeating the pressure increase and decrease. In order to refill the increased fluid, the system requires a larger motor or pump.

SUMMARY OF THE INVENTION

The present invention is directed toward more appropriate application of anti-lock braking control while also reducing the amount of brake fluid consumption that is currently experienced by anti-lock braking control systems. Systems and methods of accomplishing the foregoing are disclosed. An anti-lock brake control system typically includes a hydraulic unit having a main hydraulic circuit connecting a master cylinder and a wheel cylinder via an inlet valve, and an auxiliary hydraulic circuit connecting a wheel cylinder and an auxiliary reservoir via an outlet valve. A wheel speed sensor is provided for each wheel for determining wheel speed thereof. An electronic control device controls the hydraulic unit.

In one aspect of the present invention, if a deceleration of a rear wheel is larger than a deceleration of a front wheel, the rear wheel is controlled individually, and if deceleration of the rear wheel is not larger than a deceleration of the front wheel, the rear wheel is controlled on a select-low basis.

According to another aspect of the present invention, if anti-lock brake control is provided upon conducting braking force distribution control, a rear wheel is controlled individually, and if anti-lock control is provided while not under braking force distribution control, a rear wheel is controlled on a select-low basis. The individual control may be a continuance of the braking force distribution control.

Another aspect of the present invention is controlling of the braking such that the rear wheels are controlled on a select-low basis when it has been determined that one or more wheels are contacting a low $\mu$ road surface or if a large decompression has occurred.

Still further, a restraint means may be provided to prohibit a pressure increase in a wheel cylinder when an estimated wheel deceleration is larger than a predetermined deceleration value and a wheel slip ratio is larger than a predetermined wheel slip ratio value. The restraint means may prohibit a pressure increase in a wheel cylinder on a non-driving wheel for a duration that is longer than a duration during which a pressure increase in a wheel cylinder on a driving wheel is prohibited. The restraint means may extend its duration of operation based on a number of pressure increase cycles accomplished by the anti-lock brake control procedure. The restrain means may extend its duration of operation based on an amount of wheel speed. The restraint means may be disabled when a number of pressure increase cycles accomplished by the anti-lock braking control subroutine exceeds a predetermined value. The restraint means may be disabled when a wheel acceleration exceeds a predetermined value.

A method of controlling braking according to one aspect of the present invention, includes estimating front and rear wheel deceleration values based on wheel speed calculations; comparing the estimated rear wheel deceleration value with the estimated front wheel deceleration value to determine which value is greater; controlling braking of the rear wheels independently if the estimated rear wheel deceleration is larger than the estimated front wheel deceleration; and controlling braking of the rear wheels by select-low control if the estimated rear wheel deceleration is not larger than the estimated front wheel deceleration.

In another aspect of the invention, a determination of whether to apply braking force distribution control is made upon the initiation of braking. Braking of the rear wheels are controlled independently while controlling braking of the front wheels under anti-lock braking control when braking force distribution control has been initiated and it becomes necessary to apply anti-lock braking control to the front wheels. The independent control may be a continuance of the braking force distribution control. Braking of the rear wheels are controlled under select-low braking control while controlling braking of the front wheels under anti-lock braking control when braking force distribution control has not been initiated and it becomes necessary to apply anti-lock braking control to the front wheels.

Braking control with regard to low $\mu$ road surfaces may include estimating front and rear wheel deceleration values based on wheel speed calculations; determining that one or more wheels are on a low $\mu$ road surface if one or more estimated deceleration values exceeds a predetermined value; and controlling braking of the rear wheels under select-low control when it has been determined that one or more wheels are on a low $\mu$ road surface.

According to another aspect of the present invention, a method of controlling braking includes estimating front and rear wheel deceleration values based on wheel speed calculations; estimating front and rear wheel slip ratios, for example by subtracting vehicle speed from wheel speed and dividing the difference by vehicle speed; and prohibiting hydraulic pressure increase to rear wheel cylinders of the rear wheels when an estimated wheel deceleration is larger than a predetermined deceleration value and a wheel slip ratio is larger than a predetermined wheel slip ratio value.

The prohibition may include prohibiting a pressure increase in a wheel cylinder on a non-driving wheel for a duration that is longer than a duration during which a pressure increase in a wheel cylinder on a driving wheel is prohibited. Further, the prohibition may be extended in duration when a number of pressure increase cycles accomplished by an anti-lock brake control procedure exceeds a predetermined number. A duration of prohibiting may be determined based upon wheel speed. Prohibition may be discontinued when a number of pressure increase cycles accomplished by anti-lock braking control exceeds a predetermined value. Prohibition may be disabled when a wheel acceleration exceeds a predetermined value.

These and other objects, advantages, and features of the invention will become apparent to those persons skilled in the art upon reading the details of the invention as more fully described below.

DETAILED DESCRIPTION OF THE INVENTION

Before a detailed description of the invention below, it is to be understood that the present invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described.

It must be noted that as used herein and in the appended claims, the singular forms "a", "and", and "the" include plural referents unless the context clearly dictates otherwise. Thus, for example, reference to "a wheel" includes a plurality of such wheels and reference to "the indicator" includes reference to one or more indicators and equivalents thereof known to those skilled in the art, and so forth.

DEFINITIONS

The terms "normal braking" and "normal brake control" are used herein to describe the situation in which, when a brake pedal 11 is stepped on or applied, brake hydraulic pressure is generated in a master cylinder 12 and inlet valves 23 are opened while outlet valves 24 are maintained closed. The result of this type of control is that brake hydraulic pressure generated in the master cylinder 12 is directly transmitted to the wheel cylinders 14, thereby applying a braking effect on the respective wheels, i.e., wheels 1, 2, 3, and 4.

The terms "anti-lock braking", "ABS" and "anti-lock brake control" refer to a situation in which an electronic control device 30 determines that predetermined prerequisites or conditions have been met, and activates control parameters wherein the hydraulic pressure is controlled by repeating a pressure increase, pressure hold, and pressure decrease cycle at a predetermined frequency to eliminate or prevent a skidding situation, for example. The variation from pressure increase to pressure hold to pressure decrease is controlled by: opening an inlet valve 23 while an outlet valve 24 is closed to increase the hydraulic pressure; closing the inlet valve 23 while holding the outlet valve 24 closed to hold the hydraulic pressure in the wheel cylinder 14; and opening the outlet valve 24 to decrease the hydraulic pressure in the wheel cylinder 14.

Figure 4:
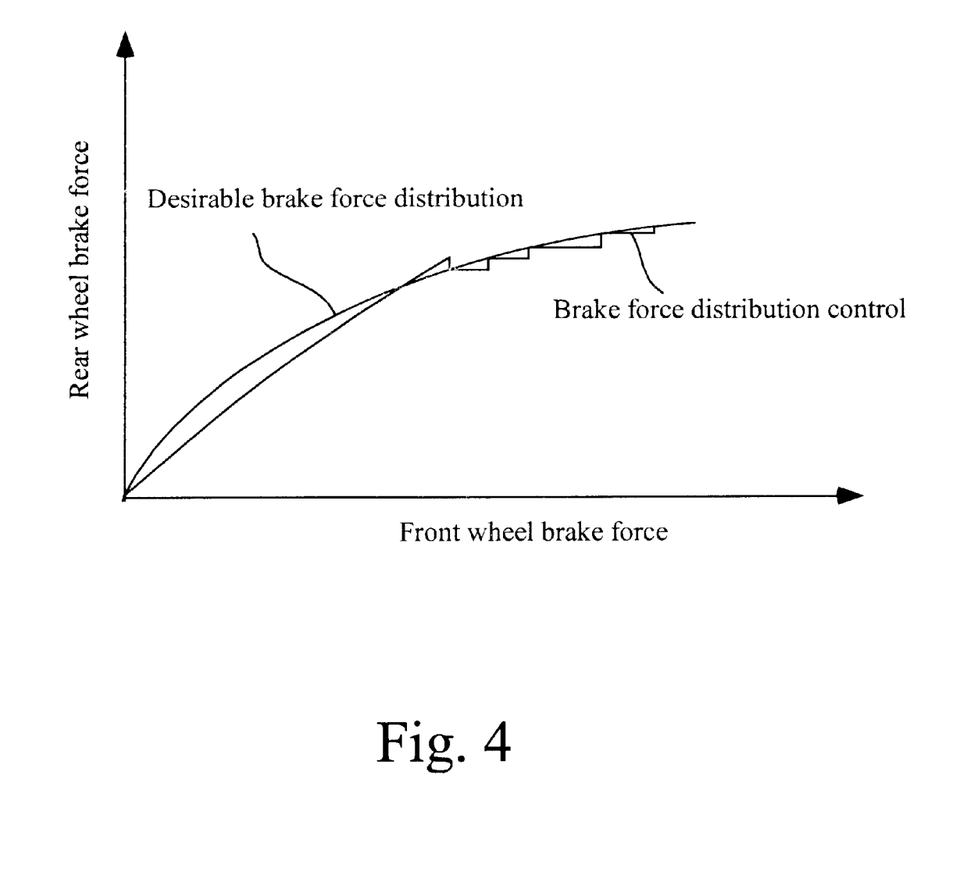
FIG. 4 is a graph showing representative characteristics of a brake force distribution control according to the present invention.

The terms "braking force distribution" and "braking force distribution control" refer to a situation in which the controller 30 controls the hydraulic pressure such that the hydraulic pressure in the rear wheel cylinders is restricted to be relatively lower than the hydraulic pressure in the front wheel cylinders. The electronic control device 30 replaces a proportioning valve used in braking systems without electronic control, to control hydraulic pressure in a rear wheel cylinder along the curve shown in FIG. 4. Additionally, when in anti-lock brake control mode, if a motor or a pump fails which thereby incapacitates the antilock brake control, the braking force distribution control takes over to control the rear wheels to prevent them from slipping.

The terms "select-low control" refer to another control scheme that is conducted by the electronic control device 30, wherein if one of the rear wheels shows a tendency of being locked and the system enters in the anti-lock brake control mode in order to secure the stability of the vehicle, the same valve control which is based on the rear wheel showing a tendency of being locked is also conducted with respect to the other rear wheel.

Figure 1:
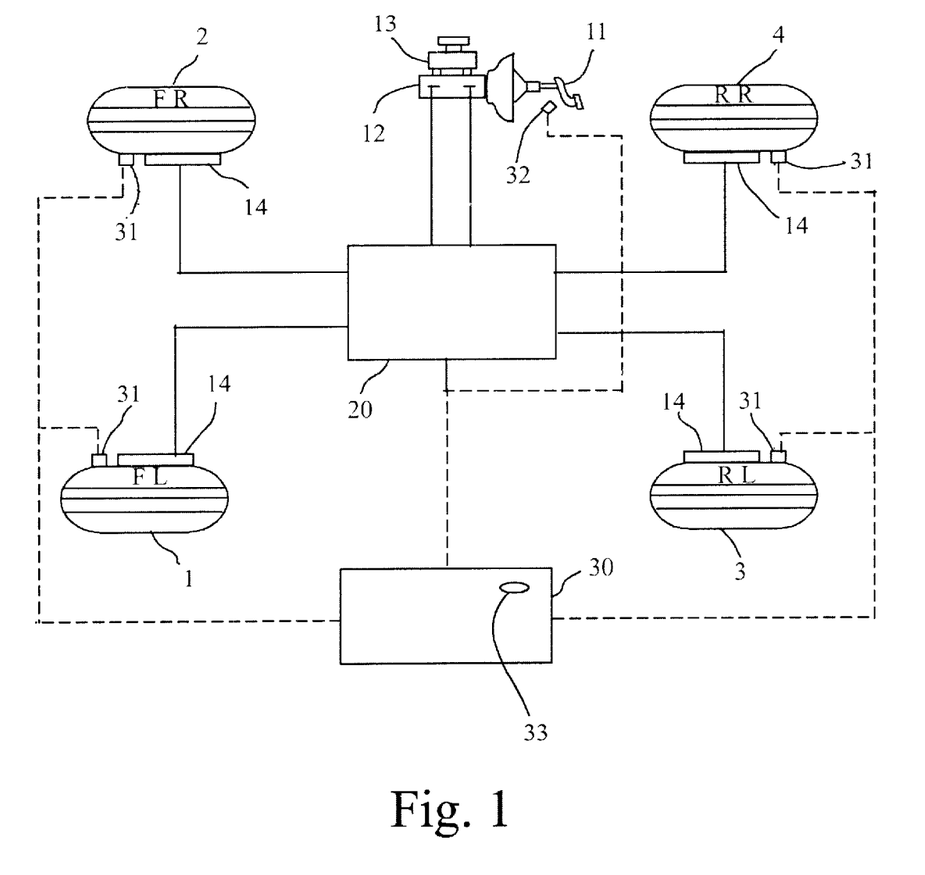
FIG. 1 is a schematic view of a brake control system employed in a motor vehicle according to the present invention.

Referring now to the Figures, a schematic view of a brake control system employed in a motor vehicle according to the present invention, is shown in FIG. 1. Hydraulic pressure generated at a hydraulic unit 20, by depression of the brake pedal 11 which actuates master cylinder 12 to apply a pressure to the hydraulic fluid within the system, is transmitted to respective wheel cylinders 14 at front (left front wheel 1, right front wheel 2) and rear (left rear wheel 3, right rear wheel 4) wheels of the vehicle, thereby actuating the braking mechanisms with respect to each respective wheel to effect a braking, slowing or stopping of the vehicle. If the brake control system is in a braking force distribution control mode or an anti-lock brake control mode, an electronic control device 30 controls the hydraulic unit 20 based on signals from wheel speed sensors 31 and a brake switch 32 to conduct appropriate brake control. The electronic control device 30 comprises a special purpose hardware or a conventional computing device such as a microcomputer, which is adapted to process the incoming signals according to the procedures described herein.

Figure 2:
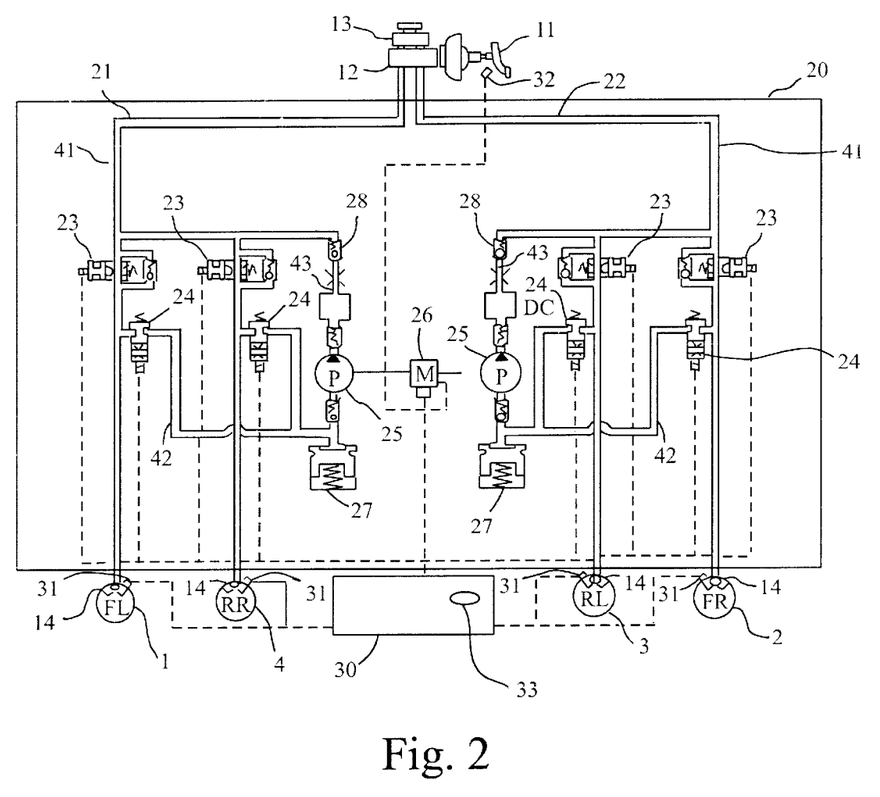
FIG. 2 is a schematic view of a circuit defining a brake hydraulic system interconnecting the four wheels of the vehicle in FIG. 1.

An example of a hydraulic unit 20 is shown schematically in FIG. 2. Hydraulic unit 20 includes a hydraulic circuit for effecting braking controls such as braking force distribution control and anti-lock brake control, as well as for effecting normal braking. The hydraulic circuit shown in FIG. 2 uses an example of a vehicle braking system known as "x-piping", where a first hydraulic circuit 21 at one side supplies hydraulic fluid to the wheel cylinders 14 respectively associated with the left front wheel 1 and the right rear wheel 4, while a second independent hydraulic circuit 22 supplies hydraulic fluid to the wheel cylinders 14 respectively associated with the right front wheel 2 and the left rear wheel 3. A main hydraulic circuit 41 connects the wheel cylinders 14 with a master cylinder 12, via hydraulic tubing and an inlet valve 23 disposed in line between the master cylinder 12 and each wheel cylinder 14, respectively. Master cylinder 12 has a main hydraulic fluid reservoir 13 mounted thereto Master cylinder 12 is actuatable by an operator's application of pressure to the foot pedal 11 which causes depression of the foot pedal 11 and compression of a piston within the master cylinder 12, which in turn applies pressure to the hydraulic fluid within the system.

An auxiliary hydraulic circuit 42 connects an auxiliary reservoir 27 with respective wheel cylinders via hydraulic tubing and an outlet valve 24 disposed in line between the auxiliary reservoir 27 and each wheel cylinder 14, respectively, which also interconnect the main hydraulic circuit 41 with the auxiliary hydraulic circuit 42. A reverse hydraulic circuit 43 returns hydraulic fluid from the auxiliary reservoir 27 to the main hydraulic circuit 41 via a pump 25, respectively, and a check valve 28 is provided between each pump 25 and the main circuit 41 to prevent backflow of fluid from the main circuit 41 to the pump 25. A motor 26 is provided to drive pumps 25 for returning the flow of hydraulic fluid to the main circuit 41. The electronic control device 30 is electrically connected to the inlet valves 23, outlet valves 24 and motor 26, whereby output signals to each of these components are provided by the electronic control device to control the pressures/flows in the hydraulic circuits of the system.

Additionally, the electronic control device is electrically connected to a brake switch 32 and wheel speed sensors 31. The electronic control device receives input signals from the brake switch 32 and wheel speed sensors 31 to make determinations as to what type of braking controlled is called for under the given conditions. The brake sensor generates an input signal when the brake pedal is depressed, which indicates to the electronic control device that the brakes have been applied by the operator.

Figure 3:
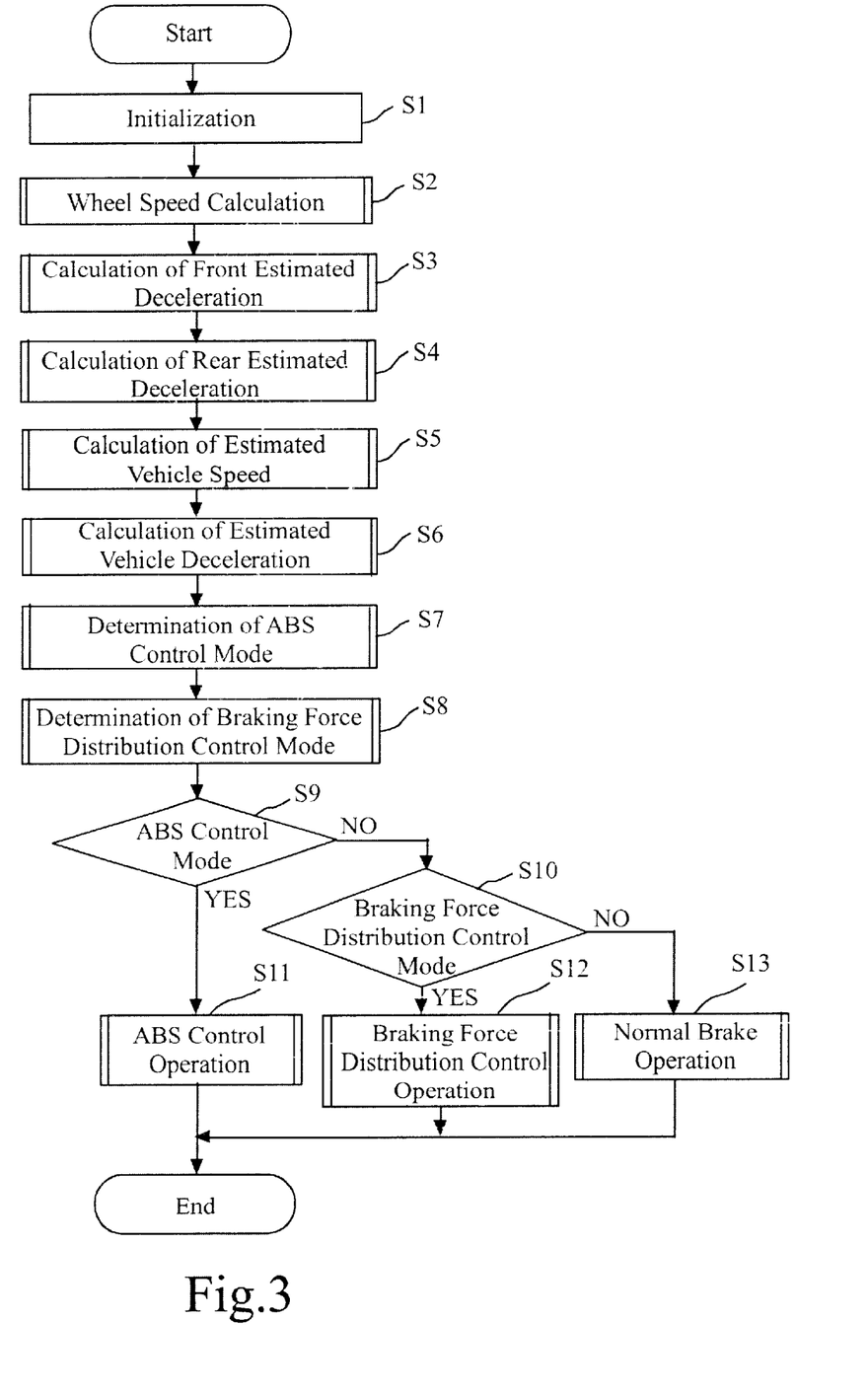
FIG. 3 is a flowchart showing steps conducted for effecting brake control according to the present invention.

The electronic control device 30 runs through a series of calculations to make a determination as to what mode of brake control is to be applied. As mentioned above, these calculations are based upon signals inputted from one or more of the wheel speed sensors 31 and the brake switch 32, for example, as shown in FIG. 3. First, the electronic control is initialized at step S1. Next, the electronic control device 30 determines the wheel speeds based on signals from the wheel speed sensors 31 at step S2. The electronic control device 30 next determines an estimated wheel deceleration of the front wheels at step S3, by iteratively sampling the wheel speeds of the respective front wheels 1,2 over time and performing an deceleration calculation therefrom. Similarly, the electronic control device 30 determines an estimated wheel deceleration of the rear wheels at step S4, by iteratively sampling the wheel speeds of the respective rear wheels 3,4 over time and performing an acceleration calculation therefrom.

An estimated vehicle speed and an estimated vehicle deceleration are then calculated, at steps S5 and S6, respectively, based upon the front and rear wheel speed data inputted and front and rear wheel deceleration estimates calculated at steps S3 and S4. Based upon the calculations performed in steps S2–S6, a determination is made at step S7 as to whether a prohibition or some type of restraint is to be placed upon the ABS braking control operation. Further, a judgement is made as to whether the control system is in anti-lock brake control mode, braking force distribution control mode or normal braking mode at steps S7 and S8. At step S9, the ABS control is directed and ABS control is effected at step S11, if it has been determined at step S7 that ABS control is needed. Otherwise control proceeds to step S10 where braking force distribution control is directed if it has been determined at step S8 that braking force distribution control is needed. If it is ABS control is directed at step S9, then the anti-lock brake control subroutine is performed at step S11. If step S10 directs brake force distribution control mode, then the brake force distribution control subroutine is run at step S12. If step S10 does not direct brake force distribution control mode, then, by default, normal brake control is conducted at step S113. Upon release of the brake pedal 11, the control protocol comes to an end.

Anti-Lock Brake Control on a High $\mu$ Road Surface

Figure 5:
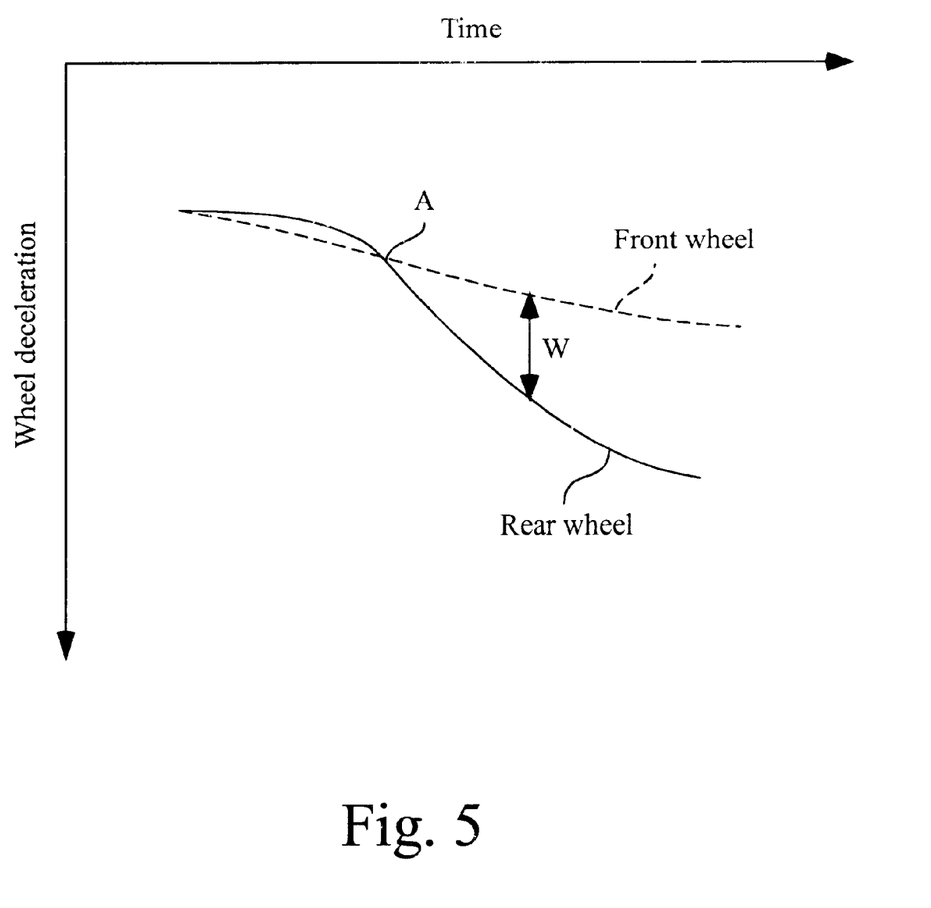
FIG. 5 is a graph showing representative deceleration characteristics of front wheels compared to rear wheels in a given situation.

If it is determined that the wheel deceleration of the rear wheels (determined at step S3) is larger than the wheel deceleration of the front wheels (determined at step S4), as is shown in FIG. 5, by the curves to the left of the intersection point A, for example, then the road surface is presumed to be a high $\mu$ road surface (i.e., a road surface having a relatively high coefficient of friction with respect to the tires of the vehicle, wherein skidding does not easily occur), and the two rear wheels are independently controlled. Accordingly, no unnecessary anti-lock brake control is conducted on the rear wheels, which reduces the amount of brake fluid consumption.

When, on the other hand, it is determined that the front wheel deceleration is larger than the rear wheel deceleration by more than a predetermined value W, as also shown in FIG. 5, after the values have intersected at A, the road surface is possibly a low $\mu$ surface, and the select-low control mode is applied. The select-low control is conducted based on the wheel showing a tendency to lock.

Figure 6:
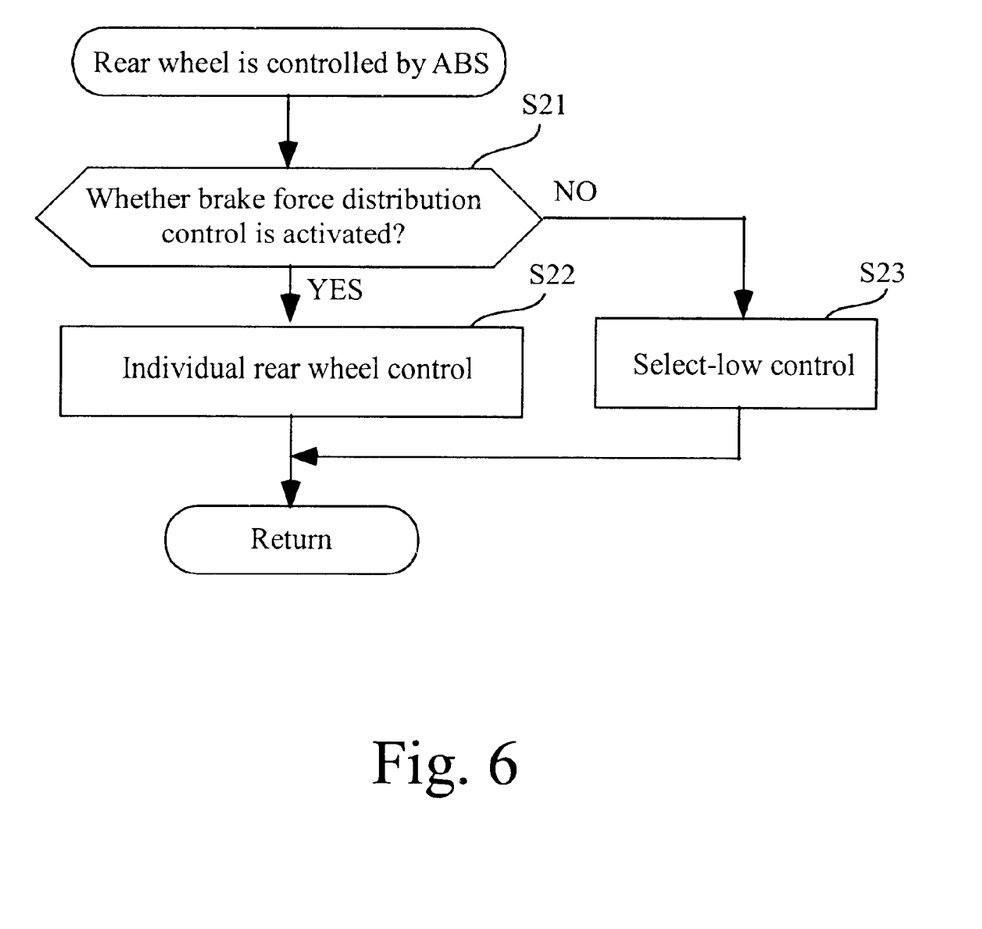
FIG. 6 is a flowchart of steps used in determining a control scheme for the rear wheels according to the present invention.

Anti-lock Brake Control on Rear Wheels after Brake Force Distribution Control Has Been Applied When anti-lock brake control becomes necessary after activation of the brake force distribution control, as shown in FIG. 6, since an appropriate hydraulic pressure is being supplied to the rear wheels, the two rear wheels are individually controlled at step S22 and unnecessary anti-lock control is restricted, which reduces the consumption of the brake fluid amount. If no brake force distribution control had been conducted prior to the initiation of anti-lock brake control (see step S21), the road surface is possibly a low $\mu$ surface. Therefore, the select-low control is conducted based on the wheel indicating a tendency to lock (see step S23).

Anti-lock Brake Control on Front Wheels after Brake Force Distribution Control has been Applied When anti-lock brake control becomes necessary after activation of brake force distribution control mode, the brake force distribution control with respect to the rear wheels is maintained to be effective. This restricts unnecessary anti-lock brake control, which reduces the consumption of the brake fluid amount.

Select-Low Control and Individual Control

If one or more wheels are determined to be on a low $\mu$ road surface or if a large decompression is found, the rear wheel control is switched to be on the select-low control. For other cases, the rear wheels are individually controlled. Accordingly, unnecessary anti-lock brake control is restricted, which reduces the consumption of the brake fluid amount. For example, determination with respect to the low µ road surface is made based on the amount of decompression relative to the duration of the slip. In addition, determination with respect to large decompression is made when the amount of decompression until recovering from the slip is large but not large enough to make a determination that a low µ road surface is being driven on.

Restraint Means to Prohibit Pressure Increase

During anti-lock control, if the wheel deceleration and the wheel slip become more than the predetermined value, a restraint means 33 (which may be a software subroutine or hardware, such as one or more additional valves that are controlled by the electronic control device, for example) is activated to prohibit a pressure increase. For example, after determination of the wheel deceleration and the wheel slip, if the values are more than predetermined values, then the restraint means 33 controls the inlet and outlet valves to prevent brake hydraulic pressure increase at the wheel cylinder.

The restraint means 33 is designed so that its duration of restraint on the driving wheel is longer than on the nondriving wheel. Generally, the brake force of the front wheel is set to be larger than that of the rear wheel, and therefore, in order to have an effective braking force on the front driving wheel, the duration of the restraint is shortened. However, since the rear nondriving wheel gives less effect on the brake force of the vehicle than the front wheel, the duration of the restraint is extended, thereby reducing the effect on the brake force of the vehicle and reducing the amount of fluid consumption, valve noise, and vibration of the brake pedal.

The restraint means 33 extends its duration of operation based on the number of pressure increase cycles conducted under anti-lock brake control. This prevents the pressure increase, which also prevents the increase in the amount of brake fluid consumption. The restraint means 33 shortens its duration of operation as the vehicle speed increases. However, risk is low when the vehicle speed is low, and therefor the restraint means is particularly effective under these conditions in reducing the amount of the brake fluid consumption.

The restraint means 33 does not operate if the number of pressure increases during the performance of anti-lock brake control is larger than a predetermined value. In such cases, the pressure increase is determined to be necessary, and the brake force of the vehicle is increased to secure the safety of the braking operation. Additionally, the restraint means 33 does not operate if the wheel acceleration is larger than a predetermined value. Here again, the pressure increase is determined to be necessary, and the brake force of the vehicle is increased to secure the safety of the vehicle during the braking operation.

According to the present invention, it is generally considered to be safer driving conditions when the vehicle is driving on a high µ road surface. Therefore, the select-low control is not conducted, which reduces the amount of brake fluid consumption while still maintaining an effective brake force application. By incorporating the brake force distribution control, the most preferable hydraulic pressure is provided. In contrast to anti-lock brake control, no frequent operations for increasing or decreasing the pressure to maintain the most preferable hydraulic pressure are required and this effectively reduces the amount of brake fluid consumption. Further, repeated valve operation is not required, which reduces the noise and vibration of the pedal during the braking operation.

It is to be understood that the specific form of the invention hereinabove described is intended to be representative only, as certain modifications within the scope of these teachings may be apparent to those skilled in the art. Accordingly, reference should be made to the following claims in determining the full scope of the invention.

What is claimed is:

1. An anti-lock brake control device comprising a hydraulic unit having a main hydraulic circuit connecting a master cylinder and a wheel cylinder via an inlet valve and an auxiliary hydraulic circuit connecting said wheel cylinder and an auxiliary reservoir via an outlet valve, a wheel speed sensor determining wheel speed of each wheel, and an electronic control device controlling said hydraulic unit, wherein if a deceleration of a rear wheel is larger than a deceleration of a front wheel, said rear wheel is controlled individually, and if deceleration of said rear wheel is not larger than a deceleration of said front wheel, said rear wheel is controlled on a select-low basis.

2. An anti-lock brake control device comprising a hydraulic unit having a main hydraulic circuit connecting a master cylinder and a wheel cylinder via an inlet valve and an auxiliary hydraulic circuit connecting said wheel cylinder and an auxiliary reservoir via an outlet valve, a wheel speed sensor determining wheel speed of each wheel, and an electronic control device controlling said hydraulic unit, wherein if anti-lock brake control is provided upon conducting braking force distribution control, said rear wheel is controlled individually, and if anti-lock control is provided while not under braking force distribution control, said rear wheel is controlled on a select-low basis.

3. An anti-lock brake control device comprising a hydraulic unit having a main hydraulic circuit connecting a master cylinder and a wheel cylinder via an inlet valve and an auxiliary hydraulic circuit connecting said wheel cylinder and an auxiliary reservoir via an outlet valve, a wheel speed sensor determining wheel speed of each wheel, and an electronic control device controlling said hydraulic unit, wherein even if anti-lock control is provided upon conducting braking force distribution control, braking force distribution control on said rear wheel is continued.

4. An anti-lock brake control device comprising a hydraulic unit having a main hydraulic circuit connecting a master cylinder and a wheel cylinder via an inlet valve and an auxiliary hydraulic circuit connecting said wheel cylinder and an auxiliary reservoir via an outlet valve, a wheel speed sensor determining wheel speed of each wheel, and an electronic control device controlling said hydraulic unit, wherein if one or more wheels are found be on a low µ road surface or if large amount of decompression in the wheel cylinder is found, rear wheel control is switched to be on a select-low basis.

5. A method for brake control, comprising the steps of:
estimating front and rear wheel deceleration values based on wheel speed calculations;
comparing the estimated rear wheel deceleration value with the estimated front wheel deceleration value to determine which value is greater;
controlling braking of the rear wheels independently if the estimated rear wheel deceleration is larger than the estimated front wheel deceleration; and
controlling braking of the rear wheels by select-low control if the estimated rear wheel deceleration is not larger than the estimated front wheel deceleration.

6. A method for brake control, comprising the steps of:

estimating front and rear wheel deceleration values based on wheel speed calculations;

estimating front and rear wheel slip ratios; and prohibiting hydraulic pressure increase to rear wheel cylinders of the rear wheels when an estimated wheel deceleration is larger than a predetermined deceleration value and a wheel slip ratio is larger than a predetermined wheel slip ratio value, wherein said prohibiting comprises prohibiting a pressure increase in a wheel cylinder on a non-driving wheel for a duration that is longer than a duration during which a pressure increase in a wheel cylinder on a driving wheel is prohibited.

7. A method for brake control, comprising the steps of:

estimating front and rear wheel deceleration values based on wheel speed calculations;

estimating front and rear wheel slip ratios;

prohibiting hydraulic pressure increase to rear wheel cylinders of the rear wheels when an estimated wheel deceleration is larger than a predetermined deceleration value and a wheel slip ratio is larger than a predetermined wheel slip ratio value; and determining a duration of said prohibiting based upon wheel speed.

8. A method for brake control, comprising the steps of:

estimating front and rear wheel deceleration values based on wheel speed calculations;

estimating front and rear wheel slip ratios; and prohibiting hydraulic pressure increase to rear wheel cylinders of the rear wheels when an estimated wheel deceleration is larger than a predetermined deceleration value and a wheel slip ratio is larger than a predetermined wheel slip ratio value; and disabling said prohibiting when a wheel acceleration exceeds a predetermined value.

9. A method for brake control, comprising the steps of:

determining whether to apply braking force distribution control upon the initiation of braking;

controlling braking of the rear wheels independently while controlling braking of the front wheels under anti-lock braking control when braking force distribution control has been initiated and it becomes necessary to apply anti-lock braking control to the front wheels; and controlling braking of the rear wheels under select-low braking control while controlling braking of the front wheels under anti-lock braking control when braking force distribution control has not been initiated and it becomes necessary to apply anti-lock braking control to the front wheels.

10. The method of claim 9, wherein said controlling the rear wheels independently controls the rear wheels under braking force distribution control.

11. An anti-lock brake control device comprising a hydraulic unit having a main hydraulic circuit connecting a master cylinder and a wheel cylinder via an inlet valve and an auxiliary hydraulic circuit connecting said wheel cylinder and an auxiliary reservoir via an outlet valve, a wheel speed sensor determining a wheel speed of each wheel, an electronic control device controlling said hydraulic unit, and a restraint means to prohibit a pressure increase in said wheel cylinder when an estimated wheel deceleration is larger than a predetermined deceleration value and a wheel slip ratio is larger than a predetermined wheel slip ratio value.

12. The anti-lock brake control device of claim 11, wherein said restraint means prohibits a pressure increase in said wheel cylinder on a non-driving wheel for a duration that is longer than a duration during which said restraint means prohibits a pressure increase in said wheel cylinder on a driving wheel.

13. The anti-lock brake control device of claim 11, wherein said restraint means extends its duration of operation based on a number of pressure increase cycles accomplished by the anti-lock brake control procedure.

14. The anti-lock brake control device of claim 11, wherein said restraint means extends its duration of operation based on an amount of vehicle speed.

15. The anti-lock brake control device of claim 11, wherein said restraint means is disabled when the number of the time pressure increase by the anti-lock braking cycles accomplished by the anti-lock braking control subroutine exceeds a predetermined value.

16. The anti-lock brake control device of claim 11, wherein said restraint means is disabled when a wheel acceleration exceeds a predetermined value.

* * * * *

UNITED STATES PATENT AND TRADEMARK OFFICE
CERTIFICATE OF CORRECTION

PATENT NO.    : 6,421,598 B1
DATED         : July 16, 2002
INVENTOR(S)   : Oshiro, Hiroshi et al.

It is certified that error appears in the above-identified patent and that said Letters Patent is hereby corrected as shown below:

<u>Title page,</u>
Insert:

-- [30]        Foreign Application Priority Data
        Aug. 10, 1999   (JP) ...................... 11-226242 --

Signed and Sealed this

Sixth Day of May, 2003

JAMES E. ROGAN
*Director of the United States Patent and Trademark Office*